Dec. 3, 1968    M. KUHLMAN    3,414,063
SOIL PERFORATING MACHINE OR AERATOR
Filed March 17, 1966    2 Sheets-Sheet 1

INVENTOR
Martin Kuhlman

Dec. 3, 1968     M. KUHLMAN     3,414,063
SOIL PERFORATING MACHINE OR AERATOR
Filed March 17, 1966     2 Sheets-Sheet 2
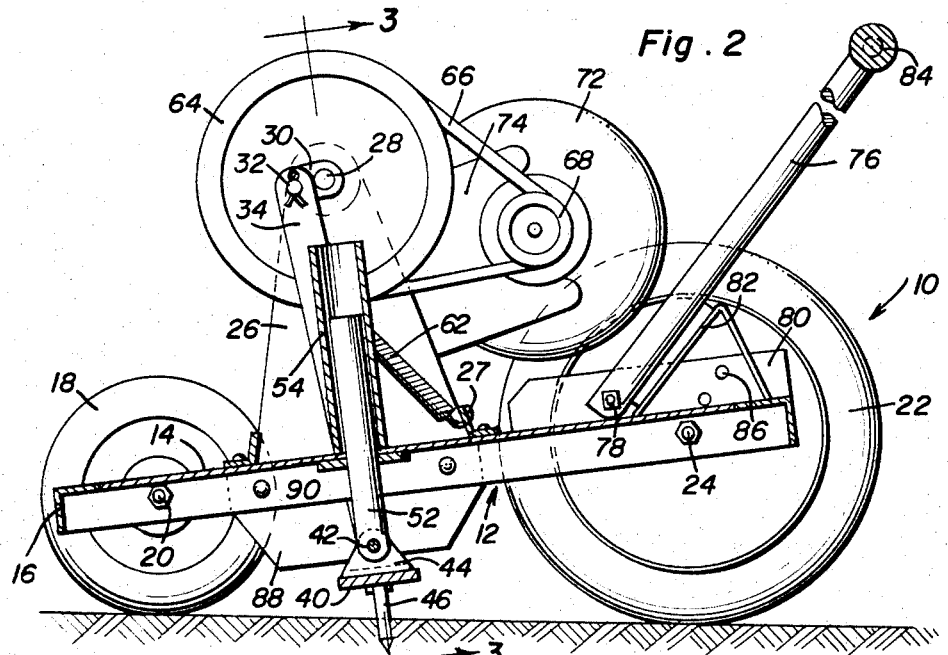
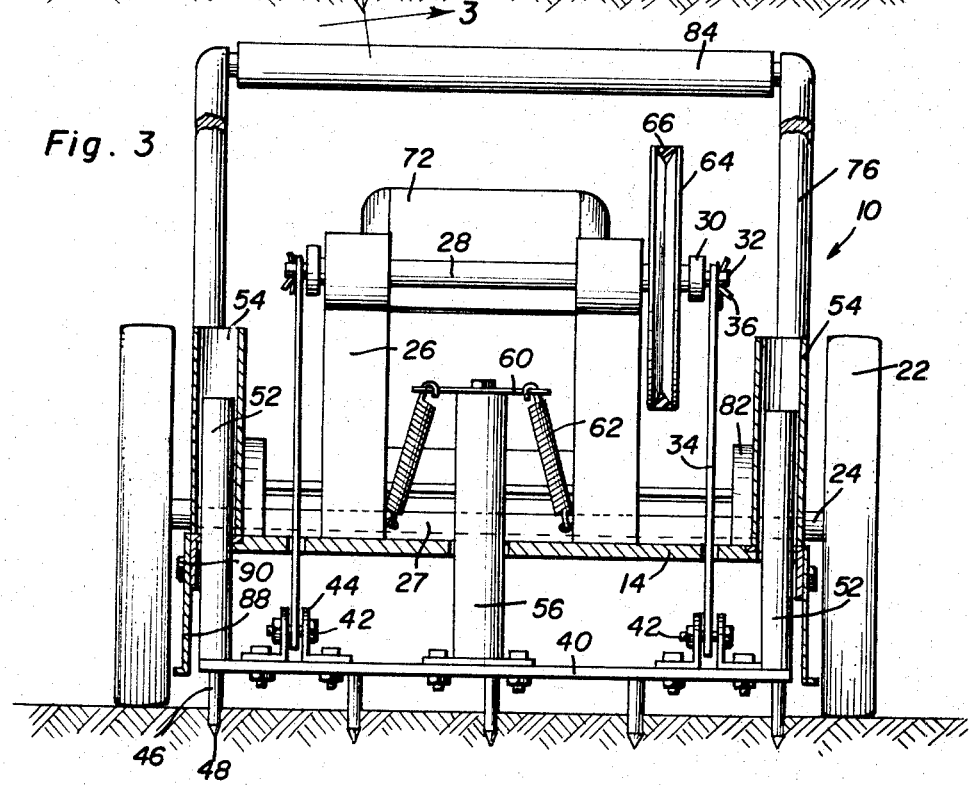
INVENTOR
*Martin Kuhlman*

United States Patent Office 3,414,063
Patented Dec. 3, 1968

3,414,063
SOIL PERFORATING MACHINE OR AERATOR
Martin Kuhlman, 772 Nightingale,
Fairfield, Calif. 94533
Filed Mar. 17, 1966, Ser. No. 535,102
8 Claims. (Cl. 172—21)

ABSTRACT OF THE DISCLOSURE

The invention comprises a wheeled lawn perforator adapted to pierce the soil with minimum disturbance of non-pierced portions of the lawn.

The present invention generally relates to a lawn aerator and more particularly an aerator employing a plurality of reciprocating spikes or prongs which penetrate the soil for aeration thereof.

Those skilled in the art have recognized for many years the advantages derived from aerating lawns and other areas where grass is grown. For example, aeration permits water to penetrate to the roots of the grass rather than running off which enables the grass to receive more benefit from rainfall as well as watering from a water system. The grass roots will grow downwardly and deeper into the soil thus providing healthier and more hardy plants. Additionally, fertilizer may be applied directly to the root area rather than lying on the surface and subjected to being washed away by heavy rainfall. Further, air is supplied to the root area which exposes insect eggs to air thus preventing maturity of such lawn destroying insects. However, even though the benefits of aeration are generally known, most home owners do not aerate their lawns because it requires considerable time and labor or the purchasing or renting of a relatively expensive machine.

Accordingly, it is an object of the present invention to provide an aerator which is extremely simple in construction, foolproof in operation, rugged and long lasting, efficient in operation and yet quite inexpensive to manufacture and maintain.

Another object of the present invention is to provide a lawn aerator in the form of mobile power operated machine which is hand controlled by a walking operator and includes a reciprocating bar wtih spikes attached thereto for moving downwardly in an inclined plane to impart a thrust force to the machine to facilitate propulsion thereof.

A further object of this invention is to provide a soil aerator having a single action reciprocating spike assembly which enables the spikes to contact and leave the soil in one single motion thus eliminating a large number of moving parts.

Still another object of the present invention is to provide a lawn aerator in accordance with the preceding objects which employs a weight and a motor oriented in the center of the machine directly over the spike operating area and the recoil area thus requiring less engine power and less spring tension to assist in driving the spikes downwardly to penetrate a lawn.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken along section line 2—2 on FIGURE 1 and illustrating the inclination of the machine;

FIGURE 3 is a transverse sectional view taken along section line 3—3 on FIGURE 2 and illustrating further structural details of the machine.

Figure 1:
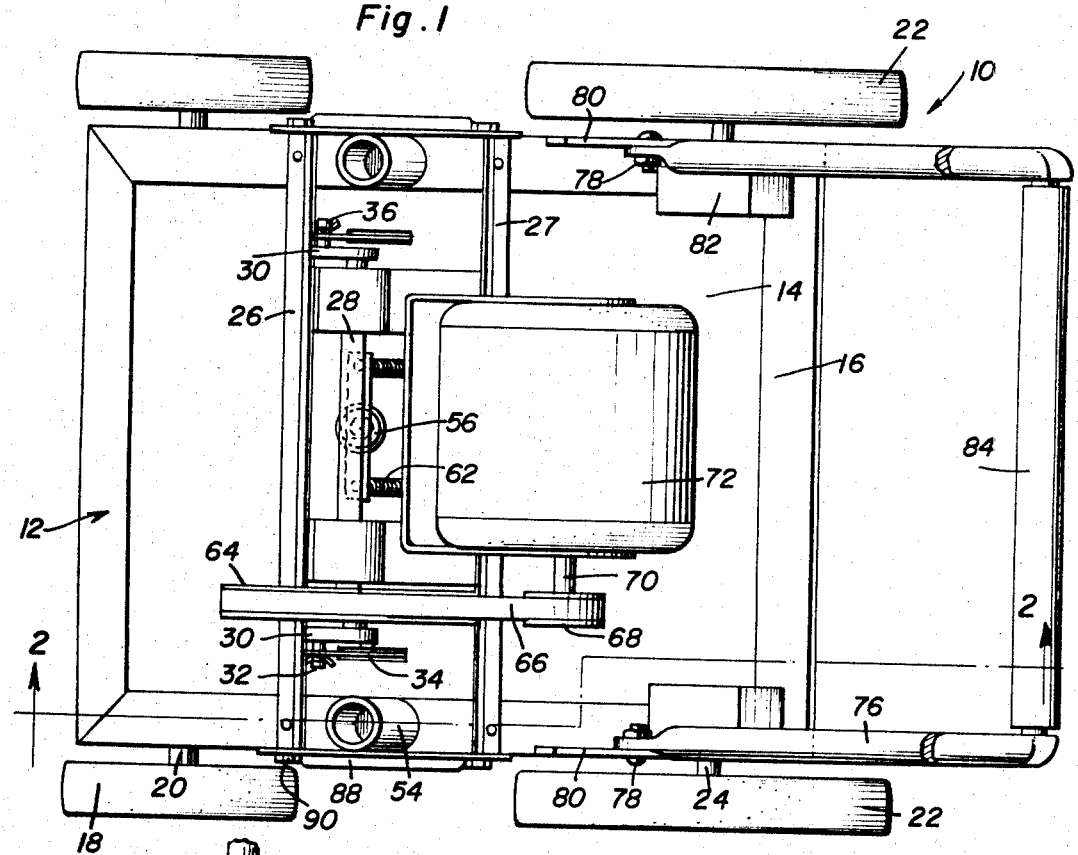
FIGURE 1 is a top plan view of the lawn aerator of the present invention.
Figure 4:
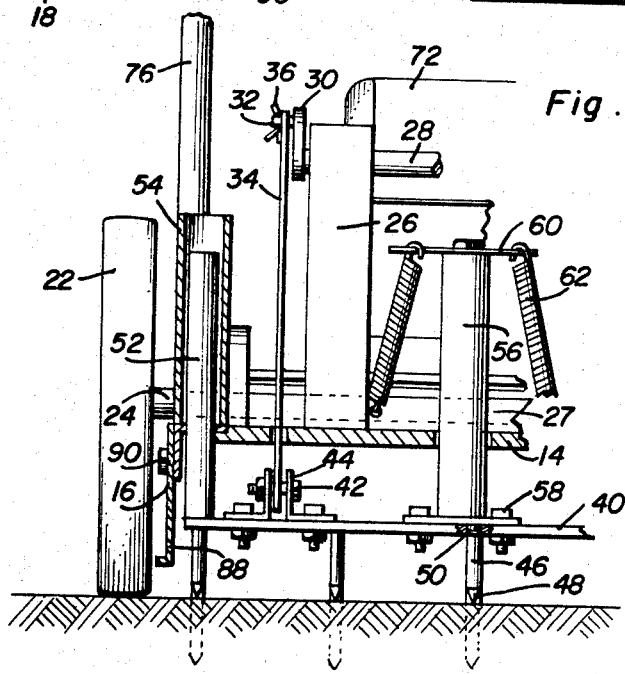
FIGURE 4 is a fragmental sectional view similar to a part of FIGURE 3 but with the spikes in elevated position.

Referring now specifically to the drawings, the lawn aerator of the present invention is generally designated by reference numeral 10 and includes a frame 12 including a deck or platform 14 and a peripheral angle iron flange 16 thus defining generally a rectangular frame 12.

Mounted at the forward end of frame 12 is a pair of front wheels 18 having supporting axles 20 fixedly attached to said flange 16. Mounted at the rear end of frame 12 is a pair of rear wheels 22 fixed to flange 16 by rigidly attached axles 24. As illustrated in FIGURE 2, the rear wheels 22 are larger in diameter than the front wheels 18 thus supporting frame 12 in a forwardly and downwardly inclined manner.

Mounted on and extending upwardly from the deck or platform 14 is a pair of bearing brackets or pedestals 26 which rotatably support a drive shaft 28 thereon. Each end of shaft 28 has an offset arm 30 rigid therewith and the arms 30 are disposed exteriorly of the bearing brackets 26. The outer end of each arm 30 is provided with a pin 32 which is pivotally connected to the upper end of a connecting rod or member 34 by extending through an aperture therein and having a pin 36 extending through the end thereof.

Each rod 34 extends down through a slot 38 in the deck 14 and is pivotally connected to a transverse spike support bar 40 by a pivot bolt 42 which extends through the lower end of rod 34 and a pair of upstanding lugs 44 on the spike bar 40. Mounted on the bar 40 is a plurality of pointed spikes or tines 46 having a tapered or pointed lower end 48 and a threaded connection 50 with the bar 40.

Rigidly attached to each outer end portion of bar 40 is an upstanding guide rod 52 disposed in perpendicular relation to bar 40. Each guide rod 52 is slidably received in a guide tube 54 mounted rigidly and in forwardly inclined relation to the deck 14 in any suitable manner such as by welding or the like. Centrally on the bar 40, an upwardly extending weight 56 is mounted by suitable fasteners 58 to enable removal and replacement thereof. The upper end of weight 56 is provided with a transverse bracket 60 to which a pair of tension springs 62 is attached. The lower ends of springs 62 are anchored to an angle member 27 rigid with deck 14 and brackets 26 to assist in urging the spike bar 40 downwardly.

For driving shaft 28, a V-belt pulley 64 is attached thereto and receives a V-belt 66 which also engages a V-belt pulley 68 on the output shaft 70 of an electric motor 72. The motor 72 is supported by a suitable bracket 74 of U-shaped configuration that is mounted on brackets 26. The bracket 74 may adjustably support motor 72 in order to keep the belt 66 taut.

A generally U-shaped handle 76 is attached to the frame 12 by bolts 78 which extend through upstanding flanges 80 on the peripheral flange 16. An angled prop or limit member 82 underlies the handle 76 and limits the downward swinging movement thereof as illustrated in FIGURE 2. Also, a hand grip 84 is mounted on the upper end of the handle 76 to facilitate control of the machine. The flanges 80 also are provided with vertically spaced holes 86 for receiving the axles 24 to enable adjustment of the rear portion of the frame 12.

A pair of depending protective shields 88 depend from the sides of frame 12 and are secured to flange 16 by bolts 90 to reduce the possibility of somewhat accidentally placing their foot under the spikes 46 when they are reciprocated.

As the spikes or tines 46 are reciprocated, they will assist in propelling the machine due to the slight rearward inclination of their path of movement. The straight line reciprocation of the tines 46 will make straight holes thus uprooting very little grass. Further, while an electric motor has been illustrated, other motors may be employed such as small gasoline engines or the like. Also, additional safety shields may be provided at the front and rear of the frame and hollow tines may be employed where desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A lawn aerator comprising a frame, wheel means mounted on said frame for supporting said frame movably above a lawn surface, an elongated bar reciprocally supported from said frame, a plurality of lawn penetrating spikes mounted on said bar for penetrating into a lawn when moved to a lowermost position and disposed above the lawn when moved to an uppermost position, means interconnecting the frame and bar to guide said bar during reciprocation thereof, and drive means on said frame and connected to said bar to reciprocate said bar and spikes thereon, and wherein said wheel means includes a pair of front wheels and a pair of rear wheels journaled on said frame, said rear wheels having a larger diameter than said front wheels, said frame being upwardly and rearwardly inclined.

2. A lawn aerator as defined in claim 1 wherein said drive means includes an elongated shaft overlying and generally paralleling said bar, each end of said shaft having an offset arm rigid therewith, and a connecting member pivotally connected between each offset arm and said bar for reciprocating the bar in response to rotation of said shaft.

3. The lawn aerator as defined in claim 2 wherein said drive means also includes a motor supported on said frame, and means transmitting rotational movement from said motor to said shaft for rotating the shaft.

4. The lawn aerator as defined in claim 1 wherein said guide means between the bar and frame includes a pair of guide rods rigid with said bar, a pair of guide tubes rigid with said frame and slidably receiving said rods for guiding the bar in a path substantially perpendicular to said frame, said spikes being disposed in said path for imparting a forward thrust on the frame when moved downwardly to penetrate the lawn.

5. The lawn aerator as defined in claim 4 wherein each of said spikes has a tapered lower end, and a threaded connection between the upper end of each spike and said bar to enable removal of the spikes for sharpening or replacement.

6. The lawn aerator as defined in claim 1 together with spring means interconnecting said bar and frame to urge said bar to its lowermost position.

7. The lawn aerator as defined in claim 1 wherein said frame includes an upwardly and rearwardly extending handle attached thereto to enable a walking operator to control the aerator.

8. The lawn aerator as defined in claim 1 wherein said bar is provided with a centrally disposed weight mounted thereon to assist the drive means when forcing the spikes into the lawn.

References Cited

UNITED STATES PATENTS

| | | | |
|---|---|---|---|
| 2,127,510 | 8/1938 | Fulton | 111—89 |
| 2,347,748 | 5/1944 | Melling | 172—21 |
| 3,163,236 | 12/1964 | Ray | 172—21 |
| 3,204,703 | 9/1965 | Hansen | 172—21 |

ROBERT E. BAGWILL, *Primary Examiner.*